L. PASTEUR.
Manufacture of Beer and Yeast.
No. 141,072.                                    Patented July 22, 1873.
Fig. 1.
Fig. 2.
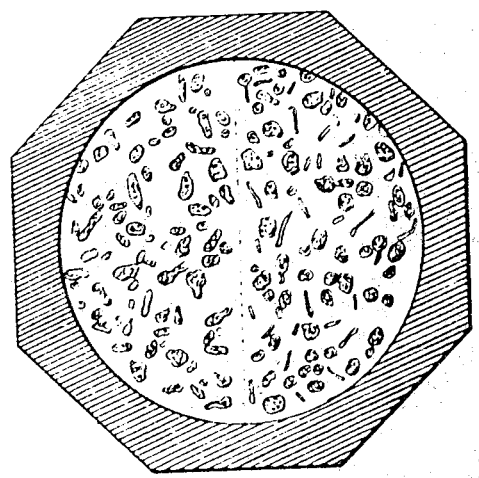
Fig. 3.
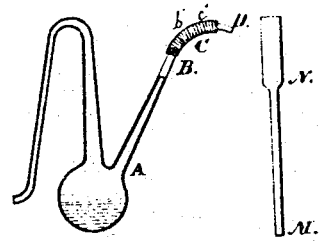
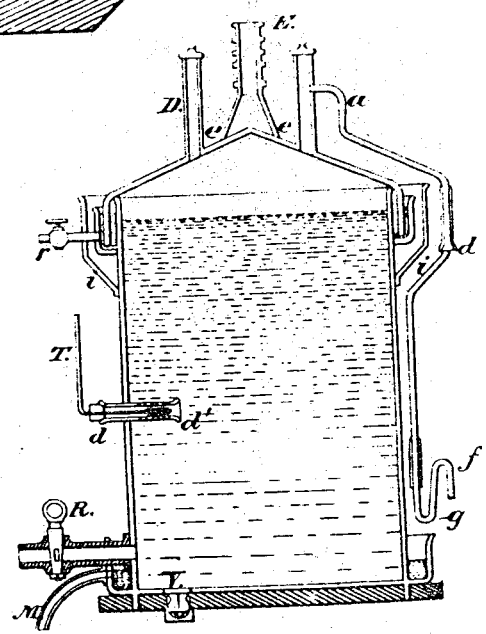
Witnesses.
Charles Delnof
Inventor.
Louis Pasteur

UNITED STATES PATENT OFFICE.

LOUIS PASTEUR, OF PARIS, FRANCE.

IMPROVEMENT IN THE MANUFACTURE OF BEER AND YEAST.

Specification forming part of Letters Patent No. 141,072, dated July 22, 1873; application filed May 9, 1873.

*To all whom it may concern:*

Be it known that I, LOUIS PASTEUR, of Paris, France, have invented Improvements in the Manufacture and Preservation of Beer and in the Treatment of Yeast and Wort, together with Apparatus for the same; and I do hereby declare that the following is a full, clear, and exact description of the same, reference being had to the annexed sheet of drawings, making a part of the same.

The variations in the condition of brewers' yeast, worts, and beer, are caused by the presence of microscopic organisms, the development and multiplication of which are accompanied by the formation of substances which change the properties of the wort, beer, or yeast, and also prevent it keeping beyond a certain time. These organisms exist in varying proportions in cooled worts, as prepared by the ordinary processes, as well as in yeast and beer.

The object of this invention is to eliminate and prevent the multiplication of these organisms by the following means, viz: First, obtaining pure yeast by separating the organic germs foreign to brewers' yeast; second, treating the wort while cooling from the time it leaves the copper, in which all the germs of disease are destroyed, until it reaches the vats, tuns, or fermenting apparatus, and even after fermentation in such manner that it shall not again receive, either by unlimited contact with the open air or with the vessels employed, any pernicious germs capable of multiplying and of subsequently changing the condition of the product; third, cooling in closed vessels in the presence of a limited supply of filtered air or carbonic-acid gas.

Pure yeast, free from pernicious germs, may be obtained in various ways, among which I will indicate the following: I take impure yeast and cause it to act on a solution of sugar-candy in pure water. When the fermentation is terminated, I decant the fermented liquid and add a fresh quantity of sugared water on the top of the yeast deposit. This operation is repeated two or three times, more or less, according to circumstances. I then take a shallow porcelain dish, first dipping it in boiling water, and put in it a little beer wort which has been recently boiled or preserved by the Appert process. I then dilute a little of the yeast deposit of the above-described fermentation in the wort, and cover it with a glass plate. The yeast, which has become more or less exhausted by its action on the sugared water, will then rise and rapidly revive, purified of all germs of disease.

This treatment may be repeated by diluting a little of the yeast deposited at the bottom of the first dish in some fresh wort.

The degree of purity of the yeast may be ascertained with the aid of a microscope, which will indicate the presence of the germs, and show whether, by means of the yeast, a beer may be produced which shall not vary in condition at any temperature.

In the diagram, Figure 1 of the accompanying drawing, the left half of the figure shows a pure alcoholic yeast, and the other half an alcoholic yeast containing the diseased germs, which are filiform in appearance. For this purpose I take a balloon, of the form shown in Fig. 2, of any suitable dimensions, and about half fill it with beer wort, which is first rendered unalterable by being boiled in the balloon itself. The neck A B is closed by an India-rubber tube, b' c', and a glass plug, C D. The plug is removed, and one or more drops of the yeast from the dish, diluted with a little of the supernatant liquid, is introduced by means of the tube M N, which ferments the wort and transforms it into beer.

If this beer, after remaining some weeks in a stove having a temperature of from 70° to 80° Fahrenheit be examined under the microscope and no germs of disease can be perceived, it will show that the small quantity of yeast introduced was perfectly free therefrom.

With yeast thus obtained large quantities may be prepared, it being generated during the manufacture of the beer itself. Yeast may also be preserved indefinitely in a pure state in contact with pure air—that is to say, air which has been purged of all diseased germs liable to affect the condition of the yeast, either in an apparatus such as that shown in Fig. 2, or other similar arrangement. It may also be carried long distances without affecting its condition, and so serve for preparing pure yeast at all seasons and in any quantity desired. By this means the brewer will be spared the necessity of obtaining a fresh supply of yeast from a brewery when his own has become deteriorated, inasmuch as he has always yeast at his disposal in an ever pure condition.

Alcoholic yeasts, which are properly distinct, may also be propagated and cultivated, without becoming altered, by the aid of the apparatus shown in Fig. 2.

I will next describe the improved process of manufacturing and preserving beer, and preparing yeast exempt from diseased germs on any desired scale.

I use the apparatus, Fig. 3, consisting of a cylindrical vessel, closed by a cover, the rim of which dips into a water-trough around the top of the vessel, provided with a cock, r. The beer-wort, properly so called, or other wort used in beer-making, is first boiled in the copper, and then poured into the cylinder, which is completely filled, and the cover put on. Then, by means of a rubber tube, c d, the metal pipe a c, opening into a stoppered pipe rising from the cover, is connected with the tube d c f g. Boiling water is then poured on the cover and on the pipes rising therefrom, which fills the trough, the overflow passing into a gutter, i i, from which the water escapes through a slit or a number of small holes in the bottom, and is collected in another gutter at the bottom of the cylinder, provided with a discharge-pipe, M.

T is a bent thermometer, for indicating the temperature of the wort, the bulb of which is protected by a perforated guard, d' d'. R V are cocks or apertures for discharging the liquid and sediment from the cylinder.

The cylinder thus filled is allowed to cool by contact of the external air, afterward assisted, if necessary, by cold water introduced at pipe E on the cover, which passes through apertures e e, and trickles down over the cylinder. Air enters the long tube g c f d c a. The yeast is then introduced through the pipe D, which is immediately closed, the carbonic acid produced during the fermentation passing off at tube f g.

A tube similar to a c d c f g may be adapted to pipe D, of a different length, if desired, for the escape of the carbonic-acid gas, while a limited quantity of air is admitted by the other tube.

The wort may be readily cooled in presence of carbonic-acid gas by introducing the latter beneath the cover during the cooling.

The tube f g may terminate by a loose plug of asbestus or cotton, or by a metal tube heated during the admission of the air. A drop of liquid in bend g will serve to indicate the movements of the gases.

The apparatus may be greatly varied in form, and any apparatus which will serve to eliminate the germs of disease, derived either from the air, the raw materials, the yeast, or the apparatus itself, will answer the purpose.

The employment of pure yeast in the above process is of prime necessity—that is to say, yeast deprived of the germs by which the beer is liable to be affected.

All kinds of beer manufactured by this process may be preserved without the aid of ice, and may be made in hot as well as cold climates, as summer as in winter.

As there is no liability of the worts undergoing any change a very small quantity of pure yeast will be sufficient to ferment it.

The following is a recapitulation of the essential features of this improved process: The wort is introduced in a boiling state into the apparatus, on which a cover is then placed, or the cylinder may be entirely closed and communicate with the atmosphere only by means of the pipes, cocks, and long tubes with which it is provided. Boiling water is then thrown on the apparatus, after which it is allowed to cool with or without the assistance of cold water, during which time air or carbonic-acid gas is admitted by the long tube g d c f c a; but previous to this one of the pipes on the cover is closed by a plug, through which passes a tube, terminating in an India-rubber tube and glass stopper. Pure wort is then fermented by pure yeast, and, when sufficiently advanced, the contents are poured through the tube in the stopper of the pipe on the cover of the fermenting apparatus.

If there is a supply of pure yeast from the preceding operation this may be used, as in the ordinary processes, the vessel being uncovered for the purpose, if necessary, after fermentation has commenced; but this might lead to great inconvenience at a subsequent period, although the use of pure yeast, manufactured according to this improved process, would of itself form a great improvement on the ordinary processes.

With the aid of the microscope and the method of control, before indicated, the change of condition, which might arise under the latter modes of treatment, may be readily ascertained; but one cooling apparatus may be used or a few, only the wort being passed into vats, (pitched or varnished on the exterior,) which are deprived of any germs of disease, either by the use of boiling water or by a recent coating of pitch on the interior.

It will be seen that the ordinary processes, and the improved method, may, if desired, be carried on simultaneously, so that brewers will be enabled to gradually transform their plant.

After the beer is made any short exposure to the air, to which it may be subjected, will have little or no prejudicial effect on its keeping qualities, and it may also be fined in the usual way.

I claim—

1. The method of obtaining pure yeast by eliminating the organic germs of disease from brewers' yeast, in the manner described.

2. Yeast, free from organic germs of disease, as an article of manufacture.

3. The vessel, having neck A B, rubber tube $b'$ $c'$, and glass plug C D, as and for the purpose described.

4. The apparatus, consisting essentially of a covered vessel having water-trough around the top, rubber tube $c$ $d$, metal pipe $a$, tube $d$ $f$ $g$, top and bottom gutters, and pipes D E, together with suitable cocks, thermometer, outlets, and inlets, substantially as set forth.

LOUIS PASTEUR.

Witnesses:
CHARLES DELUOS,
ADOLPHE GUION.